United States Patent Office 3,510,343
Patented May 5, 1970

3,510,343
DURABLE METAL OXIDE COATED GLASS ARTICLES
Robert G. Twells, New Kensington, Pa., assignor to PPG Industries, Inc., Pittsburgh, Pa., a corporation of Pennsylvania
No Drawing. Filed July 12, 1967, Ser. No. 652,677
Int. Cl. C23d 5/02; B44d 1/08, 1/16
U.S. Cl. 117—70
11 Claims

ABSTRACT OF THE DISCLOSURE

This invention relates to a durable article comprising a substrate having thereon a low-temperature melting glass enamel coating and a durable, weather-resistant transparent metal oxide coating protecting said enamel. More particularly, this invention relates to an article comprising: (1) a substrate that has a combustion temperature and melting point above about 1000° F.; (2) a low-temperature melting glass enamel adherent upon said substrate; and (3) a durable, weather-resistant, transparent metal oxide coating adherent upon said enamel. This invention especially pertains to lead borosilicate coated glass substrates having a protective metal oxide overcoat.

PRIOR ART

Glass coated articles having a metal, glass, or ceramic base, have been utilized in recent years as exterior glazing panels for buildings. Colored spandrels of various types have achieved great popularity with architects in the construction of curtain wall buildings. Enamel coated glass spandrels could be readily utilized for this purpose by having the enamel coating face the interior of the building. By placing the spandrel in this manner, it is possible to take advantage of the transparency and durability of the glass substrate. The color of the enamel shows through the glass, yet the low-temperature melting enamel having a high concentration of flux and limited durability is protected from the elements.

Presently, many buildings are being constructed with a facade constructed as an outer shield about the building, having both sides exposed to the elements. In such structures, the enamel of the spandrel is exposed to the weather. This, of course, has always been true with enameled metal spandrels used in outdoor installations inasmuch as the substrate was not transparent. It has, therefore, become desirable to improve the durability of enamels used on outdoor spandrels.

One approach towards improved spandrel durability would be to utilize enamels having a lower flux concentration. However, such enamels require higher temperatures for melting. Such an approach could prove relatively successful with clear enamels; however, colored enamels would still present a durability problem inasmuch as they contain a metal oxide colorant which tends to act as a refractory and further raises the melting point of the enamel composition. Thus, to obtain a low-temperature maturing colored enamel, it is necessary to use a frit or base composition which has a relatively high concentration of flux so that the resulting enamel will have a reasonable melting temperature. The high concentration of flux, of course, would contribute to a less durable enamel.

The patent literature known to applicant does not teach a solution to the problem discussed above. Certain patents teach overcoating an enamel coated object with precious metals for decorative purposes. U.S. Pat. 2,701,-214 and 2,916,393 issued, respectively, to Velonis et al. and Velonis, are illustrative of this type of article. Precious metals are, of course, expensive and do not generally exhibit the adhesion and durability required for outdoor spandrel applications. Also, the precious metals are applied in opaque thicknesses and thereby mask the color of the enamel coating. This, of course, is not a disadvantage for the purposes of these patents but would be a disadvantage in spandrels.

Another patent relating to overcoats for enamels is U.S. 3,284,225, issued to Smock et al. This patent relates to heat-reflective devices having a metallic substrate, a high-temperature maturing enamel coating, and a reflective metal overcoat. This patent does not indicate a solution to the problems posed hereinabove relative to spandrels. First, the patent relates to high-temperature maturing enamels and, second, it uses overcoats of metals in opaque thicknesses.

Thus, until the time of this invention, the problem of improving the durability of a low-temperature maturing enamel coating was still extant. The above-mentioned patents do not relate to spandrels or the problems associated with spandrels and are relevant to the instant invention only in retrospect.

INVENTION

It has now been discovered, however, that a durable enameled article comprising a low-temperature glass enamel coating adherent upon a substrate can be produced by overcoating said enamel with a durable, weather-resistant transparent metal oxide coating. It has been further discovered that enameled articles produced in accordance with the teaching of this invention have better gloss-retention and are more fade-resistant than enameled articles of the prior art.

Metal oxide coatings particularly useful for the purposes of this invention include tin oxide, chromium oxide, iron oxide, titanium oxide, and aluminum oxide. The protective metal oxide coatings of this invention are transparent, i.e., have a thickness of about 50 to about 2000 millimicrons although a preferable thickness is less than about 200 millimicrons. Metal oxide coatings of this type have been found to improve considerably the durability of glass enamel coated objects when the enamel has a low melting point, for example, about 900° F. to 1500° F., and especially those enamels having a melting point of about 1000° F. to about 1350° F.

The novel articles of this invention can be produced by coating a substrate that has a combustion temperature and melting point above about 1000° F. with a dispersion of a low-temperature melting glass enamel. The enamel may be finely dispersed in water or an appropriate organic liquid such as castor oil, turpentine, and the like. The substrate is then heated to a temperature sufficient to fuse said enamel, generally about 900° F. to about 1500° F., but below the combustion temperature and melting point of said substrate. The coated article is then contacted while its temperature is above about 400° F., and preferably above about 600° F., with a metal compound capable of undergoing decomposition to form a metal oxide. An adherent metal oxide film is thereby formed over the enamel coated article.

SUBSTRATE

Substrates useful in this invention include those which are relatively unaffected by temperatures above about 1000° F. It is necessary that the substrate withstand temperatures of about 1000° F. or higher inasmuch as temperatures on this order are required for fusing the glass enamel and for developing the metal oxide overcoat. The type of degradation which must be avoided at elevated temperatures are melting, combustion, severe oxidation, and the like.

Suitable substrates include various glasses, for example, soda-lime-silica glasses, borosilicate glasses, lead borosilicate glasses and the like, metal substrates of steel, nickel, aluminum, titanium and the like, and alloys thereof, and alloys of copper, zinc, and the like, and various ceramic substrates. This list of substrates is intended to be exemplary only and is not an exclusive listing of substrates useful in this invention. As pointed out above, any substrate which does not undergo substantial degradation at temperatures of above about 1000° F. can be utilized in the practice of this invention.

GLASS ENAMELS

Glass enamels useful in this invention include various clear and colored enamels having a melting point of about 900° F. to about 1500° F. Glass enamels, as the term is used in this invention, include clear enamels and colored enamels. The colored enamels are generally prepared by admixing a pigment composition and a glass frit. The term "glass frit" will be used in this invention to describe clear glasses which have a relatively low melting point.

Glass frits, and ultimately glass enamels, are prepared by melting an appropriate composition to form a glass such as a lead borosilicate glass, cooling said glass so rapidly that is shatters, crushing it, if necessary, and dispersing it in an aqueous or organic liquid medium. The dispersion of glass is referred to as a glass frit.

It is desirable to first fuse and crush the glass inasmuch as a coating may be formed therefrom at a lower temperature than if glass-forming raw materials, for example, sand, soda, and similar materials were utilized. Also, many of the alkali fluxing agents are very soluble in water, and it is desirable first to cause a chemical reaction of such alkali with silica to form an insoluble material.

Glass frits and enamels of various types are well known in the art and are commercially available. Typical commercial frits are set forth in U.S. Pat. 3,018,191 of Caban et al. Many of the commercial frits disclosed in Caban et al. are lead borosilicates. The lead borosilicate frits are frequently preferred as coatings for glass substrates because they may be readily formulated to have a firing temperature of less than about 1500° F. and a coefficient of expansion less than that of the base glass.

It is desirable for the frit or enamel to have a coefficient of expansion less than the glass substrate because this difference in expansion results in the enamel being in a state of compression upon cooling of the coated article from enamel firing temperature to room temperatures. An enamel coating has more voids than the base glass. Because of its porous structure, it has been found that a more durable article results when the enamel is in a state of compression.

The more common glass-forming materials used in enamels or frits are silica, alumina, and boric oxide. Any of these may be used as the sole glass-forming material; however, some silica is usually present in enamels or frits. In low-temperature melting enamels or frits, boric oxide is usually present also.

A high silica content increases the durability and hardness of an enamel or frit and also increases its maturing temperature. Boric oxide, which may be added to a frit composition in the form of borax ($Na_2B_4O_7 \cdot 10H_2O$) or boric acid ($B_2O_3 \cdot 3H_2O$) has an important function in enamels for it acts as a flux, reduces the viscosity of the enamel, and promotes a high gloss.

Alumina ($Al_2O_3$) may be introduced to an enamel composition as feldspar. Alumina improves the durability of an enamel, increases its refractoriness, improves strength, lowers thermal expansion, and increases hardness and brilliance.

Typical fluxes for enamels or frits are lead oxide (PbO), potassia ($K_2O$), and soda ($Na_2O$). The alkali metal oxides are used less frequently and in less quantity in enamels than lead oxide. Of the two alkali metal oxides soda is a somewhat more powerful flux and gives a more fluid melt. Potassia however produces a more brilliant glaze and requires a slightly longer firing range but is somewhat more resistant to solution by water than soda-containing enamels. To a certain extent either may be used to regulate the expansion coefficient of an enamel.

Lead oxide is the most popular flux used in low-temperature melting glass enamels. It may be introduced in three oxide forms: litharge (PbO), red lead ($Pb_3O_4$), and white lead ($2PbCO_3 \cdot Pb \cdot OH_2$). Lead oxide may also be introduced in enamel as a fritted lead silicate, for example $PbO \cdot SiO_2$ or $2PbO \cdot SiO_2$. Lead oxide, which may be present in a low-temperature melting glass enamel up to about 80 percent by weight, contributes brilliance, luster, and smoothness to the enamel. Also, it reacts with silica at relatively low temperatures.

A number of other oxides may be included in small amounts in low-temperature melting glass enamels. Calcium oxide, which is a common flux for medium to high-temperature enamels, reduces viscosity, particularly for enamels high in silica. Calcium oxide contributes stability, hardness, and toughness to an enamel. Barium oxide is frequently used as a flux or to aid in the formation of a mat-like structure. When used in small amounts, BaO improves the gloss and mechanical strength of an enamel and its resistance to organic acids. Zinc oxide, magnesium oxide, and strontium oxide may also be present in small quantities.

Other oxides may be introduced into an enamel to contribute color. Cobalt oxide, for example, gives a blue color when used in small amounts but may be used in larger amounts to yield a black color. Black colors are also available in enamels containing oxides of manganese, cobalt, and chromium in proper proportions. Green colors are commonly from chromium oxide or copper oxide. Other chromium compounds such as iron chromate, potassia dichromate, or lead chromate, may be utilized in combination with tin oxide to yield a red or pink color to an enamel. The following table illustrates typical compositions of low-temperature glass frits or enamels for utilization as a coating on glass substrates. The table is from section 6, p. 4, of the publication entitled "Lead in the Ceramic Industries," published by Lead Industries Association, New York, N.Y.

Other enamel or frit compositions are disclosed in the following U.S. Pat. 2,771,375 of Foraker, 2,969,293 of Smith, 2,245,541 of Goodwin, 2,653,877 of Deyrup. These patents relate to improved enamel compositions or to enamels formulated for specific applcations, as for example, the Deyrup patent relates to enamels especially formulated for application to metal substrates while the Goodwin patent relates to enamels specifically designed for coating glass envelopes for electric lamps.

TABLE 6-2.—TYPICAL COMPOSITIONS OF GLASS FLUXES (PERCENT OXIDE COMPOSITIONS)

| | 1 | 2 | 3 | 4 | 5 | 6 | 7 | 8 | 9 | 10 |
|---|---|---|---|---|---|---|---|---|---|---|
| PbO | 81.8 | 78.8 | 66.6 | 60.4 | 59.5 | 55.5 | 45.5 | 53.1 | 49.4 | 48.6 |
| $B_2O_3$ | 10.6 | 9.6 | 18.6 | 8.2 | 3.0 | 3.0 | 2.2 | 2.0 | 5.2 | 6.9 |
| $SiO_2$ | 7.6 | 11.6 | 14.8 | 21.4 | 32.0 | 29.6 | 36.3 | 31.7 | 26.4 | 25.0 |
| $Al_2O_3$ | | | | 3.0 | | | | | | |
| CdO | | | | 7.0 | 4.0 | 3.5 | 4.3 | 3.8 | 3.2 | 3.6 |
| $Na_2O$ | | | | | 1.5 | 4.4 | 4.8 | 3.3 | 4.0 | 3.2 |
| $TiO_2$ | | | | | | 4.0 | 4.9 | 4.3 | 3.6 | 2.4 |
| $Li_2O$ | | | | | | | 2.0 | 1.8 | 1.5 | |
| $ZrO_2$ | | | | | | | | | 6.7 | 6.7 |
| $Na_2SiF_6$ | | | | | | | | | | 3.6 |
| Firing Temperature: | | | | | | | | | | |
| (° F.) | 850 | 950 | 1050 | 1100 | 1120 | 1120 | 1100 | 1050 | 1100 | 1120 |
| (° C.) | 454 | 510 | 567 | 593 | 604 | 604 | 593 | 567 | 593 | 604 |
| Coefficient of expansion ($\times 10^{-7}$) | 104 | 85 | 76 | 73 | 78 | 89 | 97 | 98 | 95 | 85 |
| Lead solubility (p.p.m.) | cs | cs | cs | cs | 500 | 40 | 2 | 60 | 100 | 100 |
| Alkali resistance | | | | Fair | Good | Good | Good | Good | Exc. | Exc. |

NOTE.—cs indicates complete solubility.

The above description of enamels and frits is not intended to describe exclusive formulations or compositions, but to include the general type of enamels which may be utilized in this invention. This invention, of course, relates to the protection or improving the durability of low-temperature glass enamels or frits, and any non-durable enamels or frits known to those skilled in the art may be improved by the utilization of the instant invention.

As mentioned above, low-temperature melting glass enamels especially useful in this invention are the lead borosilicates. Particularly useful lead borosilicates have the following compositions:

Lead oxide—40–80 percent by weight
Boric oxide—2–15.0 percent by weight
Silica—5 to about 50 percent by weight Other oxides of the type described above may be present in the preferred lead borosilicate compositions in small quantities.

METAL OXIDE COATINGS

Metal oxide coatings useful for protecting low-temperature firing glass enamels include the oxides of tin, chromium, titanium, iron, silica, aluminum, nickel, lead, copper, zinc, vanadium, tungsten, and tantalum. Preferred metal oxides for this purpose are the oxides of tin, chromium, titanium, aluminum, and iron. These oxides are especially durable and, except for iron oxide, are substantially colorless.

Thin, transparent, metal oxide coatings may be developed from pyrolyzable or hydrolyzable metal compounds. The pyrolysis and hydrolysis methods of forming metal oxide films are well known.

Numerous inorganic and organic metal compounds may be pyrolyzed at temperatures of about 400° F. to about 1200° F. and preferably between 800° F. and 1100° F. Inorganic metal compounds such as metal halides have been frequently used as pyrolyzable metal compounds to produce metal oxide films. In U.S. Pat. 2,566,346, of Lytle et al., a process for forming tin oxide coatings by pyrolyzation of stannic chloride is disclosed.

Organic metal compounds have also been widely used to form metal oxide coatings by a pyrolyzation process. Metal soaps derived from fatty acids, for example, metal acetates, metal propionates, metal hexoates, metal octoates, and the like, have been found to form satisfactory metal oxide coatings when pyrolyzed at elevated temperatures. The pyrolyzation of compounds of this type is disclosed in U.S. Pat. 3,107,177 of Saunders et al., U.S. 3,185,586 of Saunders et al., and U.S. 3,087,831 of Browne.

Chelated metal compounds, such as the metal acetylacetonates, are found to be especially useful for producing transparent films of good uniformity. The use of metal acetylacetonates in a pyrolyzation process is disclosed in U.S. Pat. 3,202,054 of Mochel and U.S. Pat. 3,081,200 of Tompkins. All of the metal oxide coatings mentioned above may be developed by pyrolyzation of appropriate inorganic or organic metal compounds.

Metal oxide films may also be formed by hydrolysis of certain inorganic or organic metal compounds. Titanium dioxide films are frequently formed by a hydrolysis process. U.S. Pat. 2,768,909 of Haslam describes a typical hydrolysis process for the formation of titanium oxide films. Hydrolyzed titanium dioxide films have one advantage over pyrolyzed metal oxide films, i.e., development at room or low temperatures. This may be important when developing films on a low-temperature melting glass base inasmuch as higher temperatures tend to soften the glass, thereby introducing distortion. Pyrolysis temperatures of less than 1200° F. do not usually sufficiently soften commercial glass sheets or plates to cause unacceptable distortion in viewing closures and the like. Thus, the pyrolysis process may be readily used for developing metal oxide films on commercial glass substrates.

Tin oxide coatings are especially preferred as durable, protective coatings for low-temperature melting glass enamels. Tin oxide films may be readily formed from inorganic tin compounds such as tin halides, especially stannic chloride, stannous chloride, stannic fluoride, and stannous fluoride. Organic tin compounds such as tin acetate, dibutyl tin oxide, and tin octoate form especially good tin oxide films. The organic and inorganic tin compounds form tin oxide films by pyrolyzation process.

COATING PROCESS

The novel articles of this invention may be prepared by first coating an appropriate substrate, such as a sheet of glass, ceramic, or metal, with a dispersion of a low-temperature firing glass frit or enamel. The dispersion may be applied to the substrate by printing, screening, or spraying. The dispersion may be applied in sufficient quantity to develop a film of less than about ¼ mil to about 5 mils or more in thickness. The glass coating is then matured by firing at a temperature of about 900° F. to about 1500° F. As mentioned above, the enamel or frit has already been reacted at high temperatures to form a glass so that it may be applied to a substrate at a lower temperature than would be required to initially form the glass.

The enameled glass may be contacted while hot with a pyrolyzable metal compound to form a protective metal oxide overcoat. This may be done immediately upon removal of the enameled article from the heating lehr so as to take advantage of the heat content of the glass to pyrolyze the metal compound. However, if it is preferred, the enameled article may be cooled and then reheated to a pyrolyzation temperature before being contacted with a pyrolyzable metal compound. Also, the enamel article may be cooled and later contacted with a hydrolyzable metal compound such as tetraisopropyltitanate. The hydrolyzable metal compound may then be coverted to a metal oxide film by exposure to humid conditions.

The following examples illustrate specific embodiments of the instant invention; however, they are not intended to be exclusive descriptions of operable embodiments of the instant invention.

EXAMPLE I

Two plates (four feet by four feet) of polished soda-lime-silica glass were coated with a white enamel of the following composition.

| Component: | Weight percent |
|---|---|
| Lead oxide (PbO) | 65.2 |
| Silica | 24.5 |
| Cadmium oxide | 3.5 |
| Titania | 3.1 |
| Zirconia | 1.5 |
| Boric oxide | 1.3 |
| Soda | 1.0 |

The enamel was sprayed onto the glass as a slurry having a solids concentration of about 70.0 weight percent. the carrier for said slurry was a combination of about 25 percent methanol and about 75 percent water.

The enamel-coated plates were placed in a roller furnace where the temperature of the plates was gradually raised from about room temperature to about 1150° F. as the plates moved through the furnace. As one of the hot plates having a temperature of about 1150° F. exited from the furnace, it was contacted with a spray of 50 percent dibutyl tin diacetate in isopropyl alcohol.

The one finished article (spandrel A) had an enamel coating of about 0.002 inch and a tin oxide coating of about 100 millimicrons on the surface of the glass. The other article (spandrel B) had on its surface only an enamel coating of about 0.002 inch in thickness.

Both articles were exposed to weathering in a southwestern Pennsylvania location. The articles were placed at a 45° angle to the earth with the enameled surface facing upward. A portion of each surface was protected with lead foil tape so that a direct comparison between weathered and unweathered areas could be made on each specimen.

After two years' weathering exposure, the tape was removed and the panels were washed and examined. The gloss of the surface was determined by using a photovolt glossmeter 45° search head adjusted to read 100 percent gloss on polished black glass. The following table shows the comparative gloss of specimens A and B.

TABLE I

| Specimen | Glass units | | Percent change |
|---|---|---|---|
| | Taped area | Untaped area | |
| Spandrel A | 165 | 165 | 0 |
| Spandrel B | 175 | 90 | 50 |

The retention of gloss was superior on the tin oxide coated spandrel. Also, the color fastness of spandrel A appeared better than spandrel B.

EXAMPLE II

Two plates (four feet by four feet) of polished soda-lime-silica glass were coated with a dark green, translucent vitreous ceramic enamel of the following composition.

| Component: | Weight percent range |
|---|---|
| Lead oxide (PbO) | 40–60 |
| Silica | 20–40 |
| Soda | 1–7 |
| Boric oxide | 2–8 |
| Titania | 4–10 |
| Zirconia | 3–9 |
| Chromium oxide | 5–11 |
| Alumina | <2 |
| Magnesia | <2 |
| Cadmium oxide | <2 |
| Cobaltic oxide | <2 |
| Ferric oxide | <2 |
| Zinc oxide | <2 |

The enamel was sprayed onto the glass as in Example I; however, a thinner coat, about 0.0005 inch in thickness was formed. The enameled plates were fired and one was coated with tin oxide in the manner set forth in Example I.

The tin oxide coated spandrel (spandrel C) and the uncoated spandrel (spandrel D) were prepared, exposed, and examined in the same manner as spandrels A and B. Table II compares the gloss retention of spandrels C and D.

TABLE II

| Specimen | Glass units | | Percent change |
|---|---|---|---|
| | Taped area | Untaped area | |
| Spandrel C | 150 | 145 | 3 |
| Spandrel D | 125 | 75 | 40 |

The retention of gloss was superior on the tin oxide coated spandrel. Also, the color of the tin oxide coated spandrel faded less than the uncoated spandrel D.

Similar results were obtained when enameled spandrels of the type set forth in Examples I and II were over coated with thin (approximately 50 to about 200 millimicrons) films of iron oxide and chromium oxide.

While specific examples of the invention have been set forth hereinabove, it is not intended to limit the invention solely thereto, but to include all the variations and modifications falling within the scope of the appended claims.

What is claimed is:

1. An article consisting essentially of a substrate that readily withstands temperatures of above about 1000° F., and a spandrel-type coating substantially completely covering a surface of said substrate, said coating consisting essentially of a low-temperature melting glass enamel undercoat adherent upon and substantially co-extensive with said substrate, and a transparent, metal oxide overcoat adherent upon and substantially co-extensive with said enamel undercoat.

2. The article of claim 1 wherein said substrate is glass.

3. The article of claim 1 wherein the glass enamel has a melting point of about 900° F. to about 1500° F.

4. The article of claim 1 wherein the glass enamel comprises a lead borosilicate.

5. The article of claim 4 wherein the enamel has a melting point of about 1000° F. to about 1350° F.

6. The article of claim 1 wherein the metal oxide overcoat is a transparent coating of metal oxides selected from the class of oxides of tin, chromium, titanium, iron, and aluminum.

7. The article of claim 6 wherein the metal oxide overcoat is a transparent tin oxide coating.

8. A process for forming the article of claim 1 comprising
  (a) coating an entire surface of a substrate that readily withstands temperatures of above about 1000° F. with a liquid dispersion of a low-temperature melting glass enamel;
  (b) heating said substrate to a temperature sufficient to fuse said enamel but below the degradation temperature of said substrate;
  (c) contacting said coated surface with a metal compound capable of undergoing transformation to form ultimately a metal oxide; and
  (d) converting said metal compound to a metal oxide film.

9. The process of claim 8 wherein the metal compound is a pyrolyzable metal compound.

10. The process of claim 8 wherein the metal compound is a hydrolyzable metal compound.

11. The process of claim 8 wherein said coated surface is contacted with said metal compound while said substrate retains sufficient heat from said heating step to be at a temperature sufficiently high for converting said metal compound to said metal oxide film.

References Cited

UNITED STATES PATENTS

| | | | |
|---|---|---|---|
| 2,587,152 | 2/1952 | Harlan et al. | 117—125 X |
| 2,624,823 | 1/1953 | Lytle. | |
| 2,901,379 | 8/1959 | Shannon et al. | 117—125 X |
| 3,035,937 | 5/1962 | Baldauf et al. | 117—125 X |
| 3,051,589 | 8/1962 | Sanford et al. | 117—129 X |
| 3,418,156 | 12/1968 | Medert et al. | |

ALFRED L. LEAVITT, Primary Examiner

C. K. WEIFFENBACH, Assistant Examiner

U.S. Cl. X.R.

117—125, 129